(12) United States Patent
Sutliff et al.

(10) Patent No.: US 8,459,305 B2
(45) Date of Patent: Jun. 11, 2013

(54) DUAL CHAMBER ORIFICE FITTING

(75) Inventors: Eric M. Sutliff, Seminole, OK (US); Kernek E. McDonald, Holdenville, OK (US); David M. Bartley, Holdenville, OK (US); Billy R Breeden, Montgomery, TX (US)

(73) Assignee: TMCo, Inc., Houston, TX (US)

( * ) Notice: Subject to any disclaimer, the term of this patent is extended or adjusted under 35 U.S.C. 154(b) by 1354 days.

(21) Appl. No.: 11/278,927

(22) Filed: Apr. 6, 2006

(65) Prior Publication Data
US 2007/0235679 A1 Oct. 11, 2007

(51) Int. Cl.
*F16J 15/04* (2006.01)

(52) U.S. Cl.
USPC ....... 138/44; 138/94.5; 251/298; 251/317.01; 251/357

(58) Field of Classification Search
USPC ............ 251/298, 316, 317, 317.01, 357–363; 138/44, 94, 94.3, 94.5
See application file for complete search history.

(56) References Cited

U.S. PATENT DOCUMENTS

| | | |
|---|---|---|
| 1,569,305 A | 1/1926 | Robinson |
| 1,792,950 A | 2/1931 | Welcome et al. |
| 1,808,715 A | 6/1931 | Reynolds |
| 1,958,599 A | 5/1934 | Welcome et al. |
| 2,011,082 A | 8/1935 | Robinson |
| 2,014,682 A | 9/1935 | Greene |
| 2,448,071 A | 8/1948 | Anderson |
| 3,284,046 A * | 11/1966 | Allenbaugh, Jr. ........ 251/315.16 |
| 3,379,408 A * | 4/1968 | Lowrey ........................ 251/298 |
| 4,014,366 A | 3/1977 | Critendon |
| 4,379,543 A * | 4/1983 | Reaves ............................ 251/59 |
| 4,394,826 A | 7/1983 | Van Scoy |
| 4,470,429 A * | 9/1984 | Johnson ........................ 251/286 |
| 4,496,135 A * | 1/1985 | Scobie .......................... 251/308 |
| 4,634,094 A * | 1/1987 | Geiser .......................... 251/308 |
| 4,634,098 A * | 1/1987 | Varden ..................... 251/317.01 |
| 4,635,674 A * | 1/1987 | Bajka ............................ 251/175 |
| 4,863,144 A * | 9/1989 | Wilson et al. ............ 251/317.01 |
| 5,069,252 A | 12/1991 | Kendrick et al. |
| 5,085,250 A | 2/1992 | Kendrick |
| 5,186,474 A | 2/1993 | Jacobs |
| 5,188,144 A * | 2/1993 | Radossi ......................... 251/317 |
| 5,318,073 A | 6/1994 | Kendrick et al. |
| 5,456,288 A | 10/1995 | Jacobs |
| 5,836,356 A * | 11/1998 | Desai .............................. 138/44 |
| 2004/0060349 A1 * | 4/2004 | Brendle et al. ............... 73/118.1 |

OTHER PUBLICATIONS

Henry Pratt Co. Eccentric Plug Valve Brochure 1977.

(Continued)

*Primary Examiner* — John Bastianelli
(74) *Attorney, Agent, or Firm* — Wong, Cabello, Lutsch, Rutherford & Brucculeri LLP.

(57) ABSTRACT

A dual chamber orifice fitting including a first chamber maintained in fluid communication with a pipeline and a second chamber maintained in fluid communication with the first chamber. The fitting includes sealing member formed as an eccentric plug member that is selectively rotatable from a first position wherein the sealing member seals the first chamber from the second chamber, and a second position wherein the sealing member permits the first chamber to be placed in fluid communication with the second chamber. The sealing member includes a curved sealing surface having a pocket recessed therein for containing a non-metallic insert seat. The non-metallic insert seat sealingly engages a seat plate when the sealing member is in the first position. A retainer plate retains the insert seat in the recessed pocket.

12 Claims, 17 Drawing Sheets

OTHER PUBLICATIONS

DeZurik Eccentric Control Valves Design and Construction Brochure 1975.
GH Flow Automation Superior Dual Chamber Orifice Fitting Brochure 1990.
GH Flow Automation Bullseye Orifice Fitting Brochure 1994.
Precision Master Orifice Fitting Brochure.
Office Action dated Apr. 14, 1997 in U.S. Appl. No. 08/614,081 now Patent No. 5,836,356.
Office Action dated Oct. 27, 1997 in U.S. Appl. No. 08/614,081 now Patent No. 5,836,356.
Examiner Interview Summary Record (Paper #13) for U.S. Appl. No. 08/614,081 now Patent No. 5,836,356 for interview dated Mar. 24, 1998.
Notice of Allowability with Examiner's Amendment and Interview Summary dated Apr. 2, 1998 in U.S. Appl. No. 08/614,081 now Patent No. 5,836,356.
Peco Measuremaster Dual Chamber Orifice Fitting Brochure, 1986.
Peco Measuremaster Dual Chamber Orifice Fitting Operating Instructions Jan. 1989.
Peco Measuremaster Dual Chamber Orifice Fitting Parts List Mar. 1986.

* cited by examiner

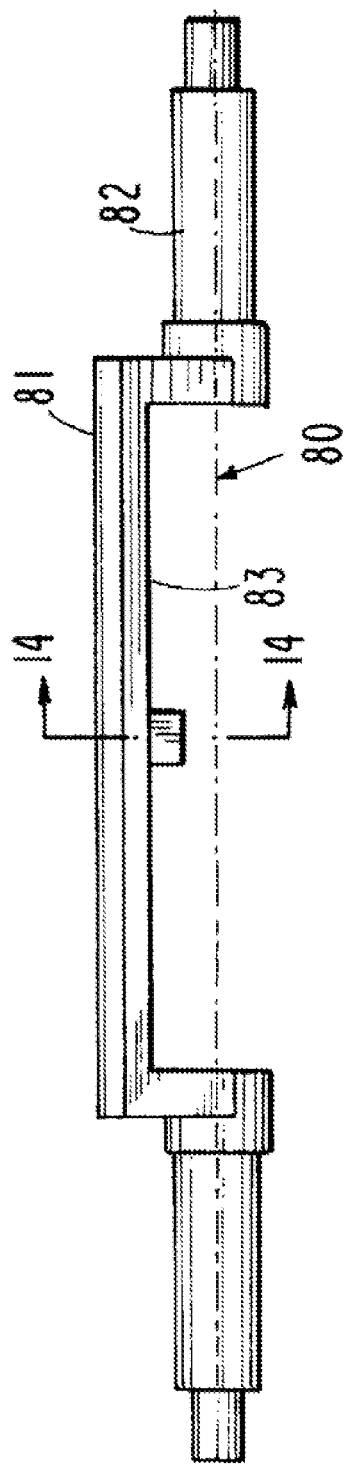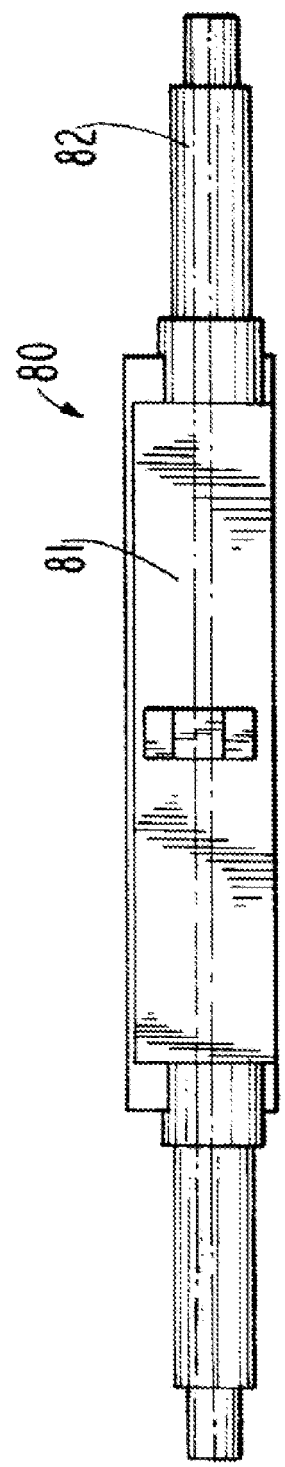

DUAL CHAMBER ORIFICE FITTING

FIELD OF THE INVENTION

The present disclosure relates generally to a flow measurement device and more particularly to a dual chamber orifice fitting comprising a flow measurement device using an orifice plate which measures and utilizes differential pressure as a basis of flow measurement.

BACKGROUND OF THE INVENTION

Generally, pipelines are used to transport fluids, including but not limited to oil and gas from wells. In order to measure the flow rate of these fluids in the pipeline, orifice plates are installed in a special fitting, or orifice plate carrier, and are thereafter installed in-line within the pipeline sections. When placed within the pipeline and in the fluid flow path, the orifice plates somewhat restricts the flow. Thereafter, a flow pressure differential develops between the flow on the upstream and downstream side of the orifice plate. Based on this measurement, and the comparison of the cross-sectional area of the pipeline to the cross-sectional area of the smaller through hole formed in the orifice plate, the flow rate of the fluid can be determined.

In many pipelines which must have their flow measured, it is very expensive or time consuming to shut down the pipeline to change the orifice plate, or make other required repairs thereto. Since the orifice plate must be placed within the pipeline in order to measure the flow of the fluid, it has been found to be beneficial to allow for the removal and replacement of such orifice plates without depressurizing the flow of fluid, and emptying the pipeline. Therefore, while early orifice plates have been situated within the pipes, and have required the shutdown of the pipe in order to change orifice plates, more recently, systems have been designed to allow for the insertion and removal of orifice plates in the pipeline without interrupting flow of the fluid therethrough.

In order to properly employ such a system which allows for the insertion and removal of such an orifice plate without interrupting the flow of the fluid, a number of features in the system are required. First, it is necessary to have a first chamber which encompasses the fluid flow path through the pipeline and second chamber, selectively spaced apart from the first chamber, which does not encompass the fluid flow path through the pipeline. These chambers must be selectively maintained either in fluid communication with each other or sealed from each other, and must be maintained in a fluid tight state even under high pressure as applied by the fluid flow in a pipeline. The system must allow for the movement of the orifice plate from the pipeline and first chamber, into the second chamber which can thereafter be separated from the first chamber by a fluid tight seal, and thereafter opened so that the orifice plate may be replaced, repaired or simply removed. Such systems have been well known in the art, and are shown in U.S. Pat. No. 5,318,073 (Kendrick, et al.) and any number of "senior" orifice fittings (senior referring to a dual chamber system), as are produced by Daniel, Perry Equipment Corporation and various other manufacturers.

As noted above, each of these apparatuses work with the requirement of a fluid tight seal between a first chamber, which is in fluid communication with the pipeline and encompasses the fluid flow path of the pipeline, and a second chamber which may be placed selectively in and out of fluid communication therewith. In order to achieve such a seal, prior art dual chamber orifice fittings rely on a sliding valve which requires the addition of grease or other sealing fluid thereto in order to insure that the valve slides properly and forms a fluid tight seal when closed. Such a sealing member is shown as closing valve V in U.S. Pat. No. 4,014,366 (Critendon). This patent describes a sliding valve fitting as is used in the prior art, whereby a sliding valve plug portion contains teeth on a portion thereof, which are meshed with a gear and rotating handle, or other automatic rotation device. By rotating this handle or device, the user moves the sliding valve plug portion against the passage between the first and second chambers, and thereby seals the second chamber from the first chamber. However, devices utilizing such a sliding mechanism has suffered from a number of defects.

First, the time required to move such a valve portion into position is great. Additionally, such a device utilizes a plurality of gears, racks and pinions complicating the device and requires the regular insertion of grease or other sealing fluid into the apparatus in order to preserve a fluid tight seal between the sliding valve plug mechanism and the casing forming the passage between the first and second chambers. Finally, since such a sliding valve plug device requires the determination by an operator whether the required fluid tight seal has been formed, and whether the sliding valve plug portion has been moved into its proper position, it is possible that the fluid flow could be released before the seal has been formed, thereby allowing fluid under pressure from the pipeline to escape and thereby not be contained within the pipeline or fitting causing a potentially dangerous situation. Therefore, it would be beneficial to provide a valve mechanism for sealing between a first and second chamber of a dual chamber orifice fitting which could be moved into place quickly, which does not require any insertion of grease or other lubrication substance, and which is simple in design and is automatically placed into the proper position to seal the chamber so that fluid cannot escape. Additionally, it would be beneficial to provide a safety locking mechanism so that the valve mechanism could not be moved from its sealed position accidentally.

The accuracy of the measurement given by the dual chamber orifice fitting depends on a large number of factors, including, as noted above, the ratio of the cross-sectional area of the through hole formed in the orifice plate to the cross-sectional area of the pipeline through which the fluid is flowing, and additionally the centering of the through hole formed in the orifice plate with the fluid flow path, and the leakage of any fluid around the orifice plate which does not flow through the through hole formed in the orifice plate.

Thus, to ensure that the orifice plate properly measures the fluid flowing in the pipeline, it is necessary to ensure that all of the fluid flowing through the pipeline is directed through the through hole formed in the orifice plate and that none is allowed to flow through the pipeline without passing through this through hole in the orifice plate. It is also necessary to insure that the seal holding the orifice plate remain fluid tight, thereby not allowing any fluid to flow through the pipeline other than through the through hole formed in the orifice plate. Such a seal member for an orifice plate is shown in U.S. Pat. No. 5,318,073 issued to Kendrick, et al., wherein a seal member is shown which extends on the upper and lower surface of an orifice plate, in order to ensure that the orifice plate is maintained in contact with solid portions of the pipe so as to ensure that fluid does not flow therebetween. While such a design has been somewhat satisfactory, such a design is most effective upon proper placement of the seal within the chamber in the pipe.

However, during insertion of the orifice plate while the fluid is flowing through the pipe, it is possible that the seal member could be improperly deformed due to the downward movement of the orifice plate and seal member through the laterally moving fluid in the pipeline. If improperly deformed, it is possible that the seal will not be properly seated, and therefore will allow fluid to pass between the seal and the orifice plate, and not direct all of the fluid through the through hole formed in the orifice plate, thereby affecting the accuracy of any fluid flow measurement. Therefore, it would also be beneficial to provide a seal member for an orifice plate which will not improperly deform when the orifice plate is inserted into a pipe under pressurized fluid conditions and which would therefore properly seal the orifice plate to the pipeline and increase the accuracy of measurement of fluid flow.

Finally, a further requirement of proper fluid flow measurement is that the through hole formed in the orifice plate through which the fluid is directed must remain properly centered in the pipeline and in the fluid flow path. However, since the orifice plate is being inserted into the pipeline and the fluid flow path under pressure, it is possible that the orifice plate might not be precisely centered within the fluid flow path. This off-center positioning may result in inaccurate measurement of fluid flow rates. Therefore, it would further be desirable to provide an orifice plate whose position can easily be adjusted while the orifice plate remains within the carrier plate.

In prior art dual chamber orifice fittings, the second, or upper, chamber is formed with two selectively openable valves. The first is an equalization valve. The use of this valve allows for the equalization of pressure between the first and second chamber, thereby allowing fluid into the second chamber, without removing the seal between the first and second chambers. The second, is a bleeding, or evacuation valve whereby after the orifice plate is moved from the first chamber to the second chamber, and the seal between the first chamber and the second chamber is replaced, the fluid maintained within the second chamber is evacuated in order to reduce the pressure therein. While the prior art devices utilize two valves for this purpose, it is possible, through operator error, to open both valves at the same time, thereby allowing material to flow under high pressure from the first chamber into the second chamber, and to be forced out the evacuation valve, thereby causing a potentially dangerous situation. Therefore, it would be desirable to provide a system whereby it is not possible for there to be communication between the first and second chambers, and between the second chamber and external atmosphere at the same time.

The above described deficiencies were addressed, to great extent, by U.S. Pat. No. 5,836,356 (the '356 patent), by Ashvin D. Desai, which is incorporated herein in its entirety. The '356 patent described a dual chamber orifice fitting comprising a first chamber maintained in fluid communication with a pipeline, a fluid flowing in the pipeline passing through the first chamber; a second chamber selectively maintained in fluid communication with the first chamber; a sealing member selectively rotatable from a first position wherein the sealing member seals the first chamber from the second chamber, and a second position wherein the sealing member permits the first chamber to be placed in fluid communication with the second chamber.

The components in devices such as described in the '356 patent must tolerate high pressures, temperatures, corrosive and sometimes lethal fluids, and preferably should be capable of extended use with few failures. Thus, there is a continuing need for improving the design and materials of such components with the goal of reducing the failure rate of the device as well as improving the safety of operating and servicing the device.

SUMMARY

Disclosed herein is an improvement on the dual chamber orifice fitting described in U.S. Pat. No. 5,836,356. The fitting includes a first chamber maintained in fluid communication with a pipeline such that a fluid flowing in the pipeline passes through the first chamber. The fitting includes a second chamber maintained in fluid communication with the first chamber. A sealing member formed as an eccentric plug member is selectively rotatable from a first position wherein the sealing member seals the first chamber from the second chamber, and a second position wherein the sealing member permits the first chamber to be placed in fluid communication with the second chamber. The eccentric plug member travels along an eccentric path between the first and second positions. The improvement resides in that the sealing member includes an elongated, essentially C-shaped body having two ends and a curved sealing surface which has a pocket recessed therein for containing a non-metallic insert seat. The non-metallic insert seat is disposed in the pocket and configured to sealingly engage a seat plate when the sealing member is in the first position. A retainer plate is disposed on the surface of the insert seat and is configured to retain the insert seat in the recessed pocket. The sealing member includes rotatable shafts connected to each of the ends of the body of the sealing member.

BRIEF DESCRIPTION OF THE DRAWINGS

FIG. 12 is a side elevational view of an eccentric plug member;

FIG. 13 is a top plan view of the eccentric plug member constructed in accordance with the invention;

DESCRIPTION

Figure 1:
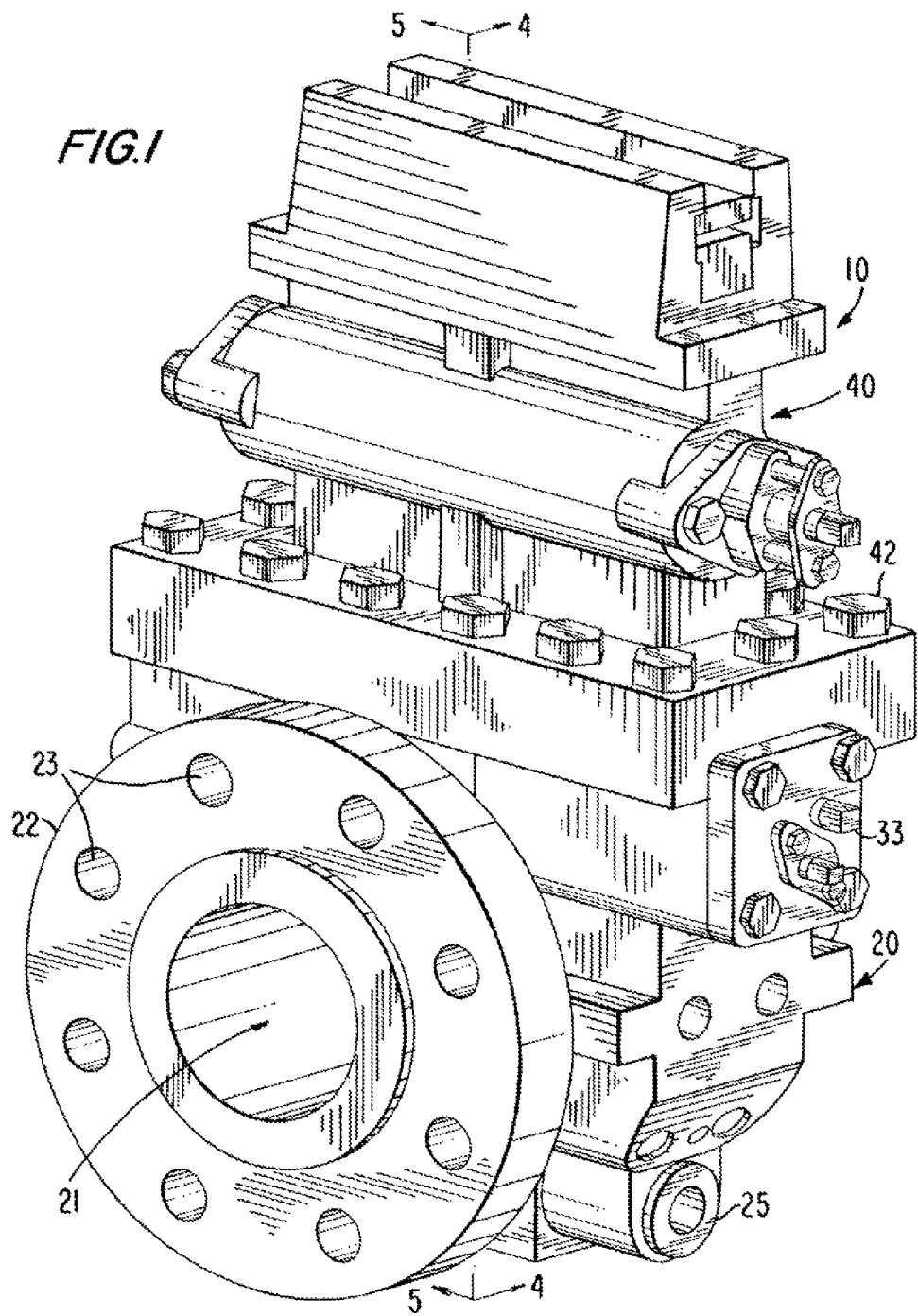
FIG. 1 is a front perspective view of a dual chamber orifice fitting.
Figure 2:
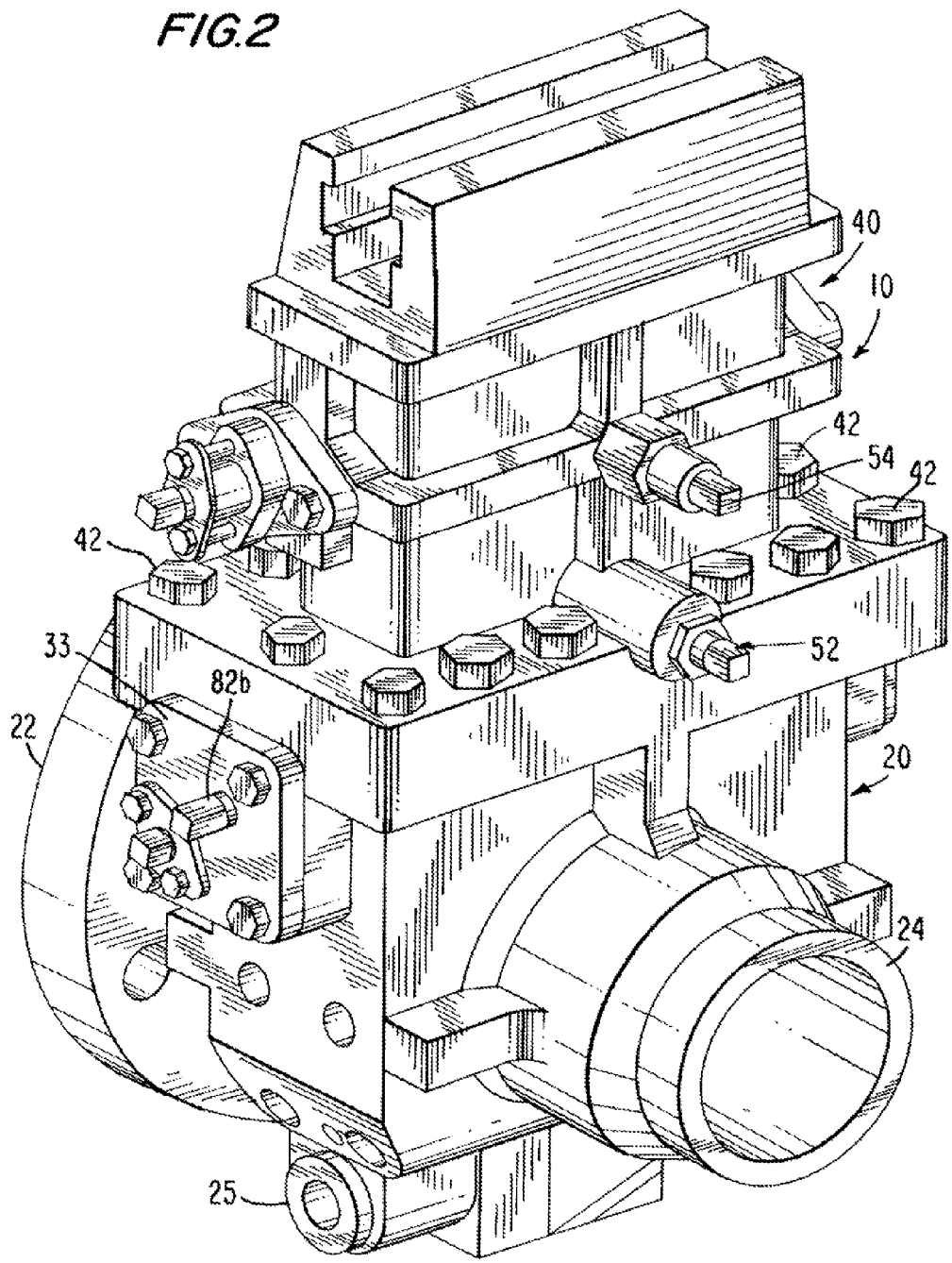
FIG. 2 is a rear perspective view of the dual chamber orifice fitting.

Reference is first made to FIGS. 1 and 2 which depict a dual chamber orifice fitting 10 constructed in accordance with a first embodiment of the invention. Dual chamber orifice fitting 10 includes an inlet 24 for receiving fluid flow from a pipe. A flange 22 formed on a back side of orifice fitting 10 about outlet 21 is used to bolt orifice fitting 10 to a section of a pipeline, which is not shown. Flange 22 is further formed with bolt holes 23 which are included for this purpose. Alternatively, flange 22 may include weld bevels (not shown) thereby allowing flange 22 to be welded directly to the pipeline. Additionally, a combination of welding and bolt holes using bolts (not shown) may also be employed to secure fitting 10 to the pipeline. An inlet 24 is situated on a back side of dual chamber orifice fitting 10 opposite flange 22, to which the pipeline is attached, and which allows for the fluid flowing through the pipeline and orifice fitting to enter the fitting, thus returning the fluid to the pipeline after passing thru the embodiment.

Dual chamber orifice fitting 10 is further formed with a first lower chamber and a second upper chamber 40. As is known in the art upper chamber 40 is affixed to lower chamber 20 by bolts 42, or the like. As is discussed further below, the first lower chamber 20 comprises a portion of dual chamber orifice fitting 10 which operates as part of the pipeline, and in which an orifice plate 65 (described below) is retained during use. Furthermore, second upper chamber 40 is a portion of dual chamber orifice fitting to which orifice plate 65 is moved when it is to be changed or repaired, thereby separating orifice plate 65 from the fluid flow.

Figure 3:
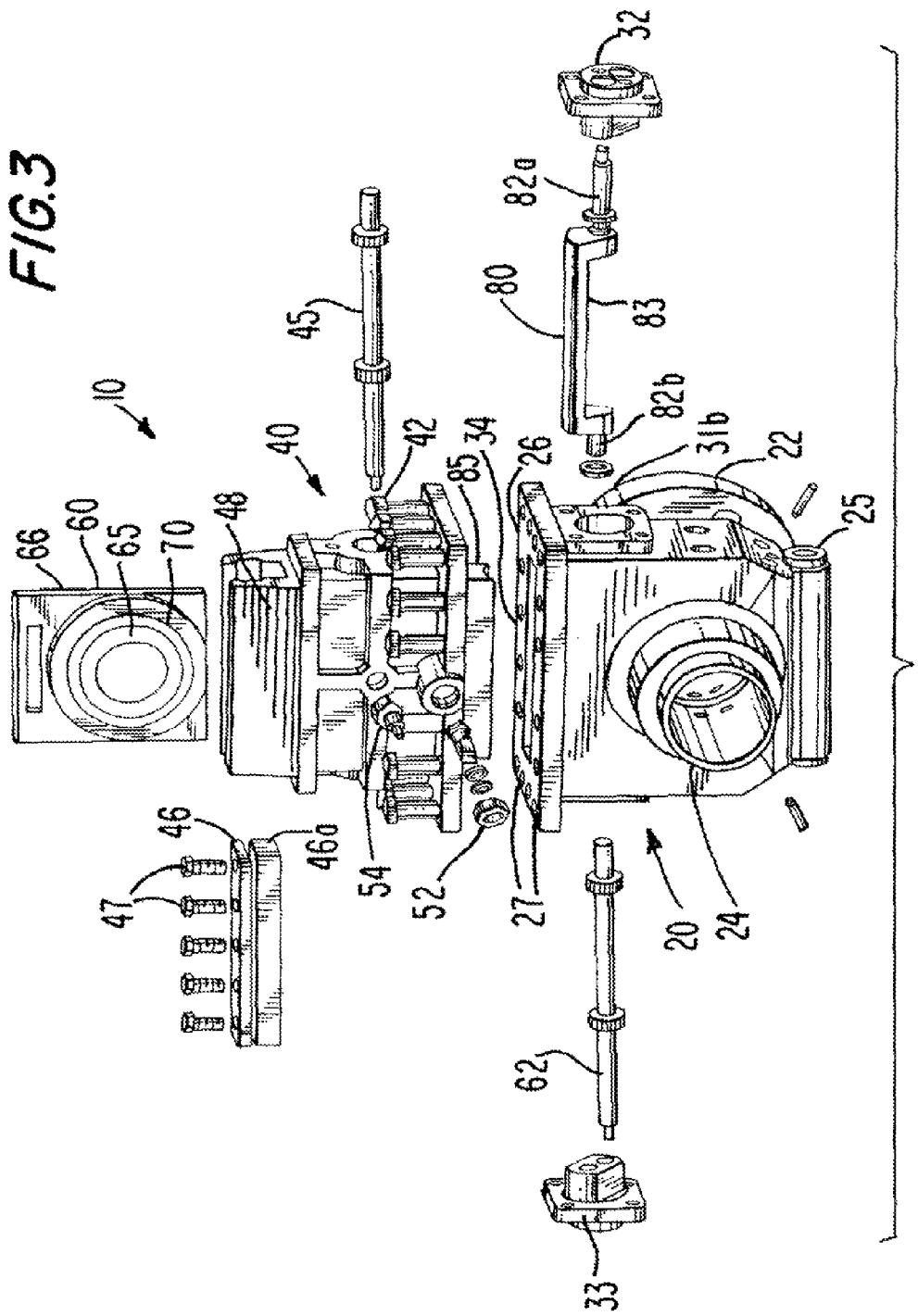
FIG. 3 is an exploded perspective view of the dual chamber orifice fitting.

Now making reference to FIG. 3 as well, lower chamber 20 includes a support surface 26 having an opening 34 therein for supporting upper chamber 40 in a meeting relationship. Bolt holes 27 are formed in support surface 26 for receiving retaining bolts 42. A cavity 28 is formed in lower chamber 20 and a slit 29 is formed to provide a passageway between cavity 28 and a flow passage 30 (FIG. 4) formed between inlet 24 and outlet 21. Opening 31b and symmetrical outlet 31a (not shown) are disposed coaxially to each other in sides of lower chamber 20. A cover 32 is mounted to lower chamber 20 at opening 31a and a gland retainer 33 is mounted to lower chamber 20 at opening 31b.

Reference is again made to FIG. 3, which depicts an exploded view of dual chamber orifice fitting 10, wherein first lower chamber 20 and second upper chamber 40 have been separated from each other. First lower chamber 20 is provided with an eccentric plug member 80, a rotational movement rod 62 and adjustment pins 75, in addition to the elements previously described, each of which will be discussed in detail below.

Figure 4:
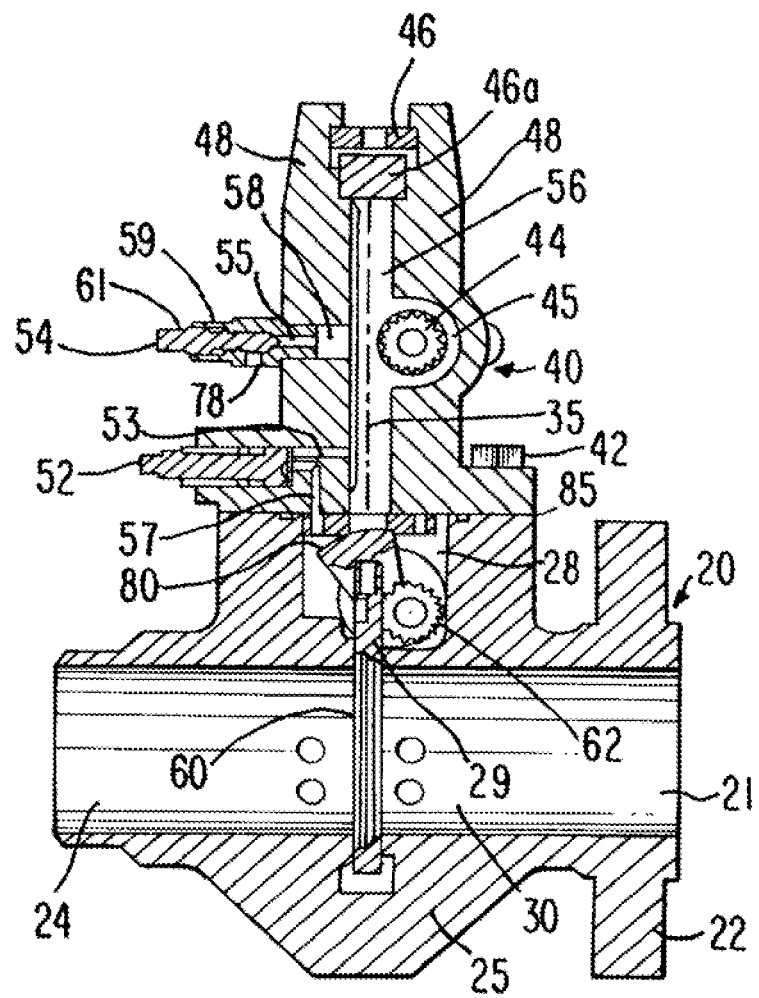
FIG. 4 is a cross-sectional view taken along line 4-4 of FIG. 1.
Figure 6:
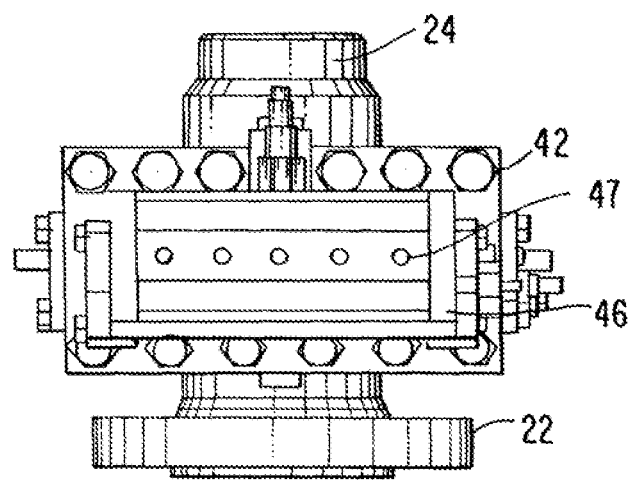
FIG. 6 is a top plan view of the dual chamber orifice.

As is shown in FIGS. 4 and 6, second upper chamber 40 is formed independent of first lower chamber 20, but during use is maintained in intimate contact therewith through the fixing of second upper chamber onto first lower chamber through the use of attachment bolts 42. These chambers are situated relative to each other so that communication path 35 is aligned in the two chambers, and a continuous communication path 35 is formed therethrough.

Figure 5:
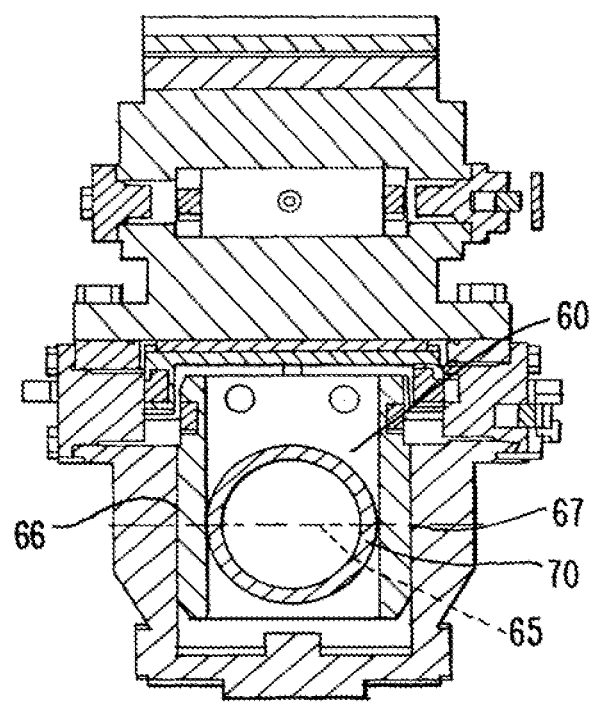
FIG. 5 is a cross-sectional view taken along line 5-5 of FIG. 1.

Referring to FIGS. 4 and 6, second upper chamber 40 is further formed of a body portion 48, the top of which is sealed by an upper retaining member 46 and a sealing member 46a, both of which are retained against body portion 48 by retaining bolts 47 to seal cavity 56 at the top thereof. Retaining bolts 47, upper retaining member 46 and sealing member 46a are selectively removable to allow access to cavity 56 of second upper chamber 40. A plate movement rod 44 having gears 45 thereon is rotatably mounted within cavity 56. Plate movement rod 44 may be rotated after engagement of gear ratchet 63 with parallel gear racks 66 and 67 (FIG. 5) of orifice plate 60 (described hereinafter) in order to further move orifice plate 60 in the vertical direction, and also to move orifice plate 60 out from body portion 48 of second upper chamber 40 when required, after retaining bolts 47, upper retaining member 46 and sealing member 46a have been removed.

As is shown in FIGS. 2 and 3 and more specifically in FIG. 4, second upper chamber 40 is formed with a cavity 56 therethrough. A pressure equalization channel 53 provides a fluid path between cavity 56 and the exterior of chamber 40. A channel 57 provides a pathway between cavity 28 and the exterior of upper chamber 40. A third channel 58 also extends from cavity 56 to the exterior of upper chamber 40.

Pressure equalization valve 52 disposed within channel 53 and is displaceable between a first position in which channel 53 and channel 57 are closed from each other preventing formation of an equalization path between first lower chamber 20 and second upper chamber 40, and a second position whereby first lower chamber 20 and second upper chamber 40 are placed in fluid communication with each other through a pressure equalization path formed by channel 53 and channel 57.

A sleeve 59 is seated in channel sleeve 58. Sleeve 59 is formed with an opening 61, an inlet 78 and a pressure evacuation path 55. A pressure evacuation valve 54 seated within sleeve 59 is displaceable between a first position, whereby pressure evacuation path 55 communicates with inlet 78 placing cavity 56 in fluid communication with ambient air, or other evacuation apparatus, and a second position blocking inlet 78 whereby pressure evacuation path 55 and cavity 56 are not in fluid communication with ambient air or the like.

Eccentric plug member 80 is rotatably mounted within cavity 28 between cover 32 and gland retainer 33. Eccentric plug member 80 is specifically designed to form a fluid tight seal between first lower chamber 20 and second upper chamber 40 when positioned in its sealing position. Eccentric plug member 80 includes a substantially C-shaped portion 84 having an inner face 83 and outer face 81. Off center plug member shafts 82a, 82b extend from plug portion 84 from either end thereof and allow the eccentric rotation of eccentric plug member 80 within cavity 28. Shafts 82a, 82b can be attached to eccentric plug member 80 via pinning, welding, etc., or shafts 82a, 82b and eccentric plug member 80 can be manufactured as a single unit, for example, by casting. Shafts 82a, 82b are rotatably supported by cover 32 and gland retainer 33, respectively. Eccentric plug member 80 is selectively rotatable from a first position, in which eccentric plug member 80 forms a fluid tight seal between first lower chamber 20 and second upper chamber 40, and a second position whereby first lower chamber 20 and second upper chamber 40 are placed in fluid communication through a communication path 35 (see FIG. 4).

According to one embodiment, eccentric plug member 80 is formed of a rubberized material so as to ensure a proper seal between outer face 81 thereof and radial engaging face 86 of seat plate 85, and which does not require the use of grease or other lubricant to allow proper movement thereof. Additionally, grease or other sealing fluid is not required to insure a fluid tight seal. Alternatively, eccentric plug member may be formed of a non-rubberized material such as a metal or a ceramic and may include a non-metallic insert seat to insure a fluid tight seal, as described in greater detail below.

Figure 10:
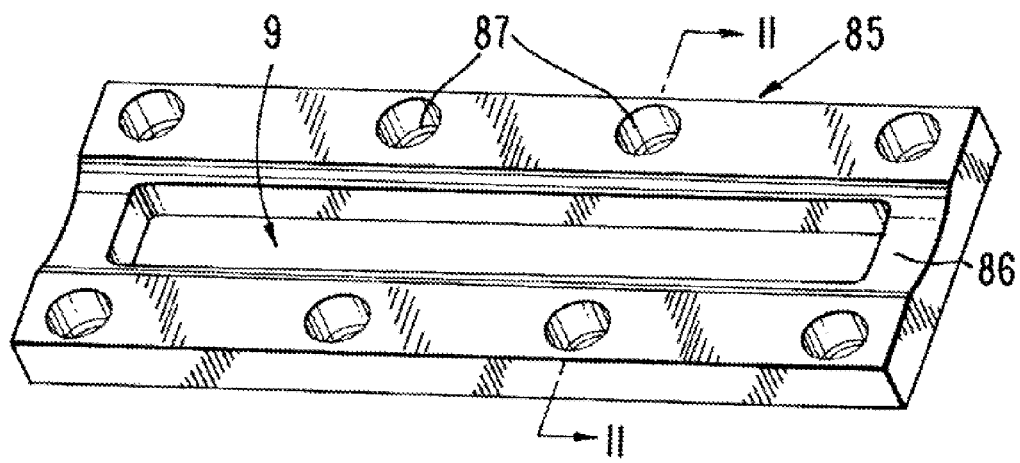
FIG. 10 is a perspective view of a plug fitting for seating an eccentric plug member.
Figure 11:
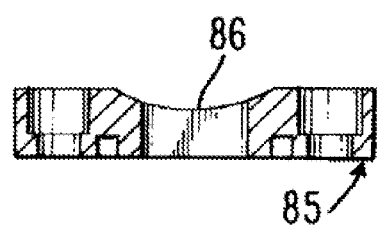
FIG. 11 is a cross-sectional view taken along line 11-11 of FIG. 10.
Figure 14:
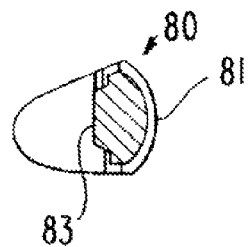
FIG. 14 is a cross-sectional view taken along line 14-14 of FIG. 12.

In order to ensure that eccentric plug member 80 forms a fluid tight seal, a seat plate 85 is mounted to upper chamber 40 about communication path 35 to engage eccentric plug member 80 when eccentric plug member 80 is in the first position. As is more specifically shown in FIGS. 10 and 11, seat plate 85 includes a radial engaging face 86 formed about a slit 89 which is dimensioned to engage outer face 81 of eccentric plug member 80 as is more explicitly shown in FIGS. 12-14. Therefore, when eccentric plug member 80 is retained in its first or sealing position, outer face 81 thereof is maintained in contact with radial engaging face 86 of seat plate 85, thereby forming a fluid tight seal therebetween. The pressure from the fluid flowing through first lower chamber 20 imparts a force upon inner face 83 of eccentric plug member 80, thereby further aiding the maintenance of a fluid tight seal.

Figure 20:
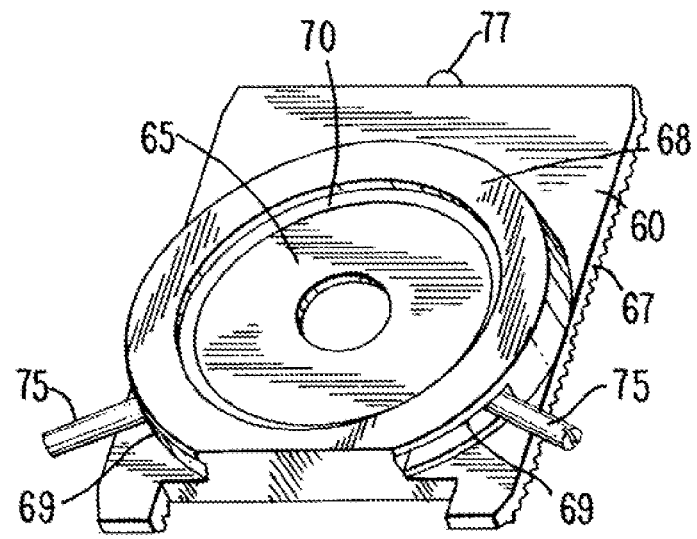
FIG. 20 is a perspective view showing adjustment pins and orifice plate carrier.

Dual chamber orifice fitting 10 also includes an orifice plate carrier 60. An orifice plate 65 is fixed to orifice plate carrier 60 through an orifice plate seal 70, all of which are shown in FIG. 20. As is additionally shown in FIG. 5, orifice plate carrier 60 further comprises parallel gear racks 66 and 67 extending vertically along the outside edge of one surface of orifice plate carrier 60. During use, as shown in FIG. 4, orifice plate carrier 60 is disposed within flow passage 30. Orifice plate carrier 60 can be raised and lowered within dual chamber orifice fitting 10 by shaft 62 and pinions 63 which mesh with parallel gear racks 66 and 67 to vertically move orifice plate carrier 60 between a first position in flow passage 30 and a second position in cavity 56. Rotation of shaft 62 in a first direction moves orifice plate carrier 60 through communication path 35. After a predetermined amount of movement in the vertical direction, gears 45, mounted in second upper chamber 40, come into contact with contact parallel gear racks 66 and 67 and rotate to continue the upward movement of orifice plate carrier 60 and its associated components into second upper chamber 40 so that orifice plate carrier 60 is completely disposed within cavity 56.

Figure 7:
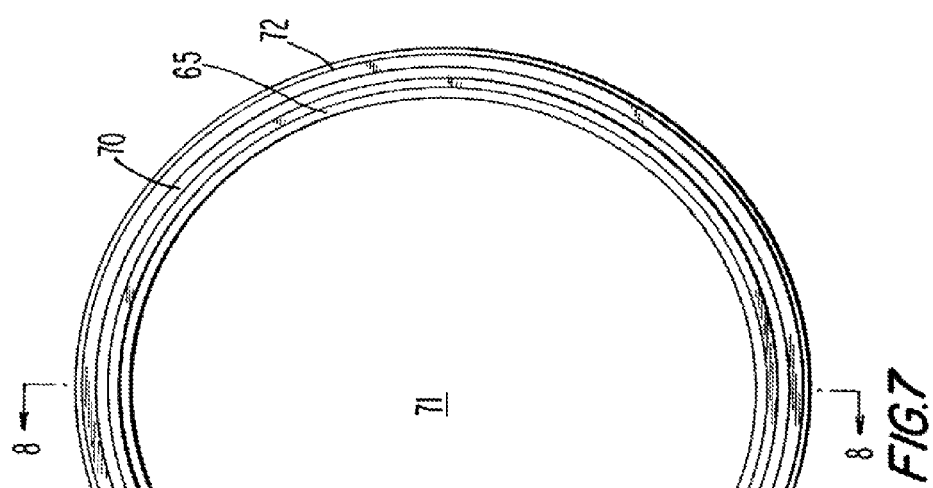
FIG. 7 is a top plan view of an orifice plate seal member and an orifice plate.

Orifice plate carrier 60 is formed with an opening 71 therethrough to receive orifice plate 65 and orifice plate seal member 70 disposed between orifice plate 65 and orifice plate carrier 60. As is further shown in FIGS. 7-9, orifice plate seal 70 engages the outer circumferential edge of orifice plate 65. Orifice plate seal 70 is formed with a planar portion 74 which is maintained in contact with orifice plate carrier 60. Planar portion 74 extends to a bead portion 79 to form a shoulder 84 therebetween. An angled outer circumferential edge 73 of orifice plate seal 70 forms an obtuse angle .theta. with orifice plate carrier 60. Orifice plate collar 64 includes an angled interior circumferential edge 88 which forms an acute angle with orifice plate carrier 60 which is the compliment of angle .theta.

Figure 8:
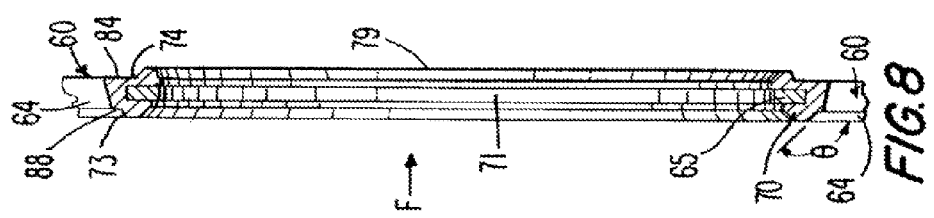
FIG. 8 is a cross-sectional view taken along line 8-8 of FIG. 7.
Figure 9:
FIG. 9 is a side elevational view of the orifice plate seal member.
Figure 17:
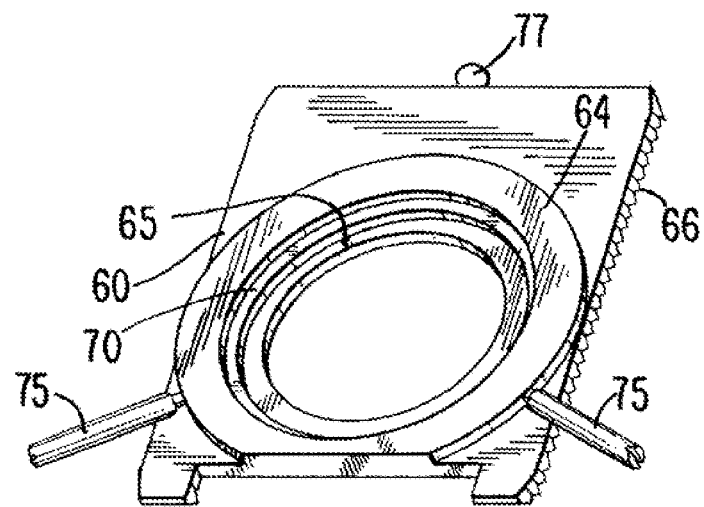
FIG. 17 is a perspective view of an orifice plate carrier.
Figure 18:
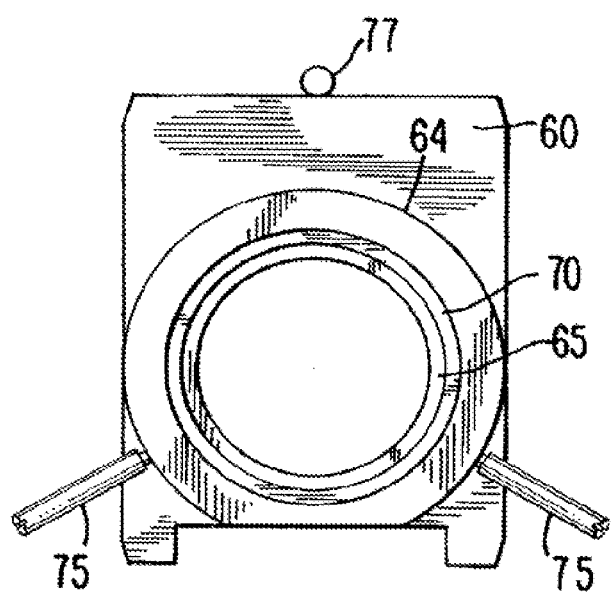
FIG. 18 is a top plan view of the orifice plate carrier.

As is more completely shown in FIG. 8, orifice plate seal 70 is inserted into orifice plate carrier 60 after orifice plate 65 has been inserted into orifice plate seal 70. The angled outer circumferential edge 73 of orifice plate seal 70 engages the interior circumferential edge 88 of a collar portion 64 of orifice plate carrier 60, as is shown in FIGS. 17 and 18, anchoring seal member 70 between shoulder 84 and outer circumferential edge 73 to form a substantially fluid tight seal between seal 70 and collar 64. As shown in FIG. 8, fluid flows in the direction opposite of arrow F through a pipe in which the dual chamber orifice fitting, and in effect orifice plate carrier 60, orifice plate 65 and orifice seal 70 have been inserted. Orifice plate carrier 60 carries orifice plate 65 on the upstream side thereof. Thus, the fluid pressure against orifice plate seal 70 compresses seal 70 against the inner circumference of collar 64 and helps to ensure the fluid tight seal between orifice plate seal 70 and orifice plate 65, thereby facilitating all fluid passing through the pipe to pass through orifice plate 65. Angled outer circumferential edge 73 of orifice plate seal 70 catches angled interior circumferential edge 88 of collar portion 64 so that the engagement of orifice plate seal 70 with the collar portion 64 of orifice plate carrier 60 ensures that during insertion or removal of orifice plate carrier 60, a fluid tight seal is maintained between orifice plate 65 and orifice plate carrier 60, thereby insuring that fluid does not leak around the edges of orifice plate seal 70.

First lower chamber 20 is further provided with adjustment pins 75 for adjusting the position of orifice plate carrier 60, or orifice plate 65, when in position within first lower chamber 20 and under fluid flow conditions. As is shown in FIG. 17, in a first embodiment, adjustment pins 75 are situated against the outside edge of collar portion 64 which is in turn formed integrally with orifice plate carrier 60. In this embodiment, two adjustment pins are provided. Also provided is a ball plunger 77 situated at the top of orifice plate carrier 60 to impart a downward force thereon. As shown in FIG. 18, each of pins 75 and plunger 77 imparts a force on orifice plate carrier 60, these forces allowing for the fine positioning of orifice plate carrier 60. By adjustment of these adjustment pins 75, collar portion 64 and orifice plate carrier 60, along with orifice plate 65 and orifice plate seal 70 can be moved relative to first lower chamber 20. This movement relative to first lower chamber 20 allows for fine adjustment of the positioning of the orifice plate carrier 60, and thereby allows an operator to properly center orifice plate 65 within the fluid flow path.

Figure 19:
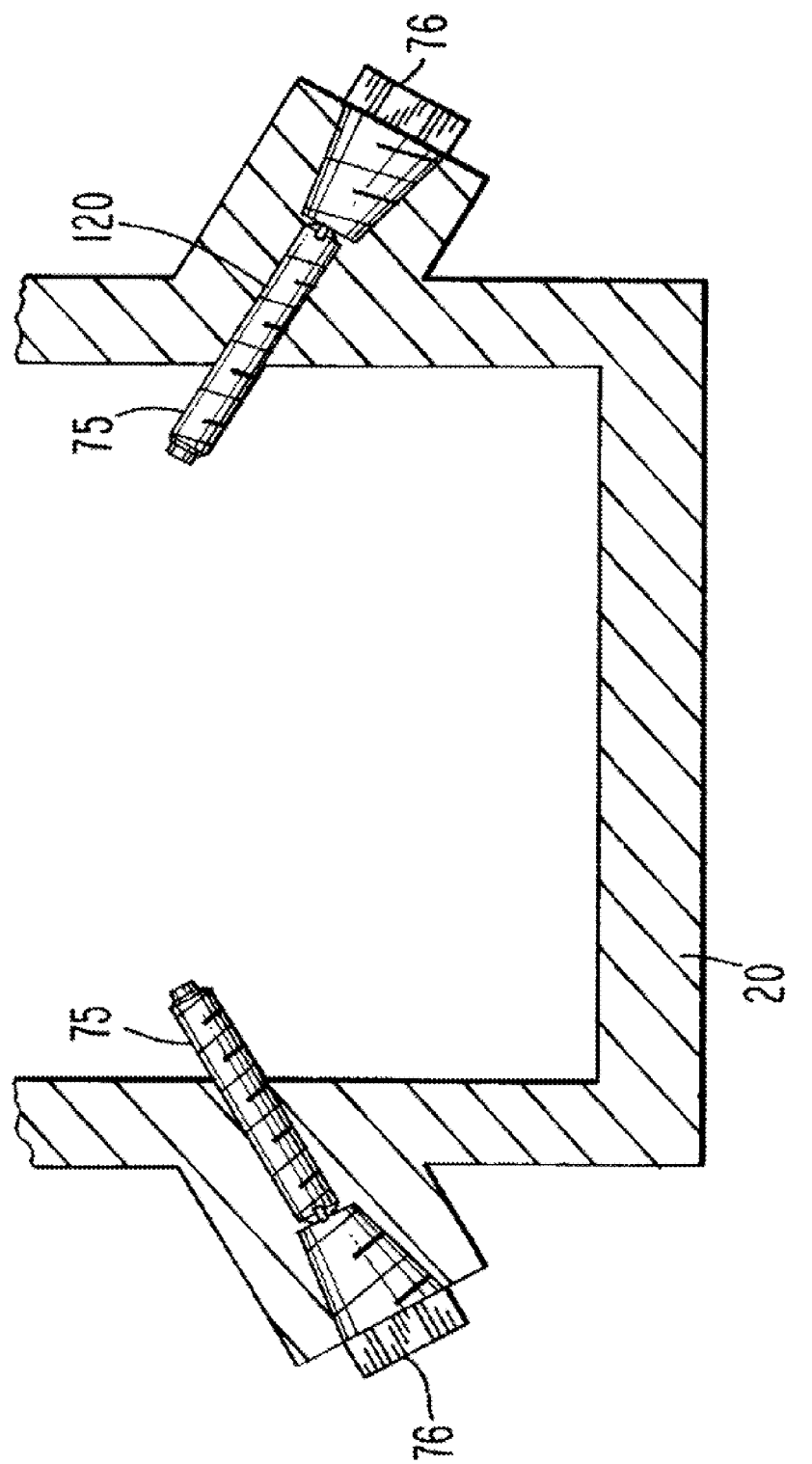
FIG. 19 is a sectional view of the orifice plate adjustment pins and first lower chamber.

As is further shown in FIG. 3, and FIG. 19, adjustment pins 75 are retained within the outer wall 120 of first lower chamber 20. When plugs 76, disposed within outer wall 120, are removed from first lower chamber 20, access may be had to adjustment pins 75 from outside the dual chamber orifice fitting 10 while orifice plate carrier 60 and associated hardware is within the fluid flow path. Therefore, these adjustments ensure the centering of the opening formed in the orifice plate and, thus the proper working of the apparatus. Adjustment pins 75 are adjusted to move the collar portion 64 relative to first lower chamber 20 and therefore orifice plate carrier 60 to the left, right and vertically. Therefore, these two adjustment pins 75, along with the downward force imparted by ball plunger 77 allow for adjustment of the positioning of the orifice plate relative to the fluid flow as needed. The use of orifice plate carrier 60, orifice plate seal 65, orifice plate 70, adjustment pins, and any other associated hardware may also be used with a single chamber orifice fitting.

When it is desirable for the first lower chamber 20 and second upper chamber 40 to be placed in fluid communication with each other, eccentric plug member 80 may be rotated to a second position whereby outer face 81 is removed from contact with radial engaging face 86 thereby opening communication path 35 and placing the two chambers in fluid communication with each other, and thus allowing fluid to flow from first lower chamber 20 into second upper chamber 40. When in its second position, eccentric plug member 80 also allows for the movement of orifice plate carrier 60 through communication path 35, as is discussed below.

Figure 23:
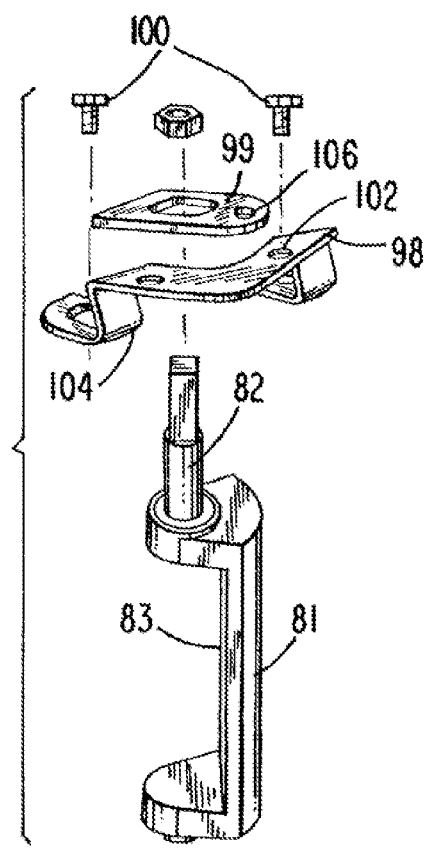
FIG. 23 is an exploded perspective view of a safety locking mechanism constructed in accordance with the invention.

FIG. 23 depicts a locking device to insure that a plug member is not inadvertently opened. Specifically, a bracket 98 is attached to a side of the first lower chamber 20 adjacent cover 32 by bolts 100. Bracket 98 is formed with at least two holes 102, 104 therein. A positioning retainer 99 is fixed to a portion of plug member shaft 82 extending through cover 32 and rotates therewith. Retainer 99 is formed with a hole 106 therein. As is shown, plug member shaft 82a can be rotated between a position in which hole 106 of retainer 99 is aligned with hole 104 of bracket 98 and a second position in which hole 106 of bracket 99 is aligned with hole 107 of bracket 99. To secure the position of plug 80, a padlock or the like could be passed through hole 106 when aligned with holes 102 or 104, thereby insuring that the plug will not be rotated inadvertently.

Figure 25:
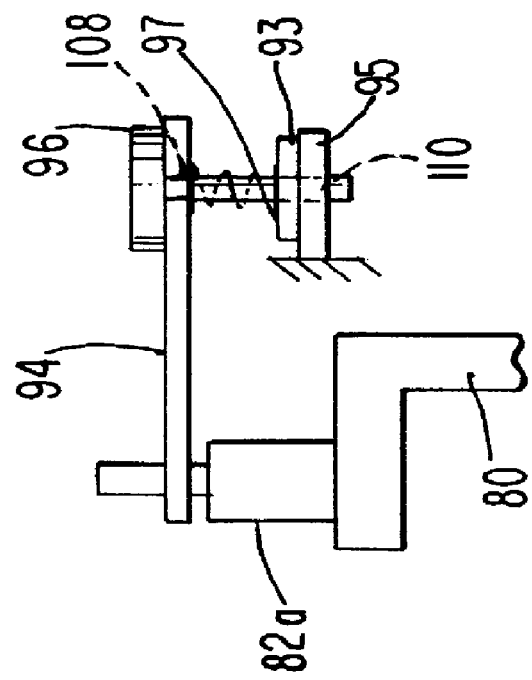
FIG. 25 is a side elevational view of the spring loaded mechanism in the locked position.
Figure 24:
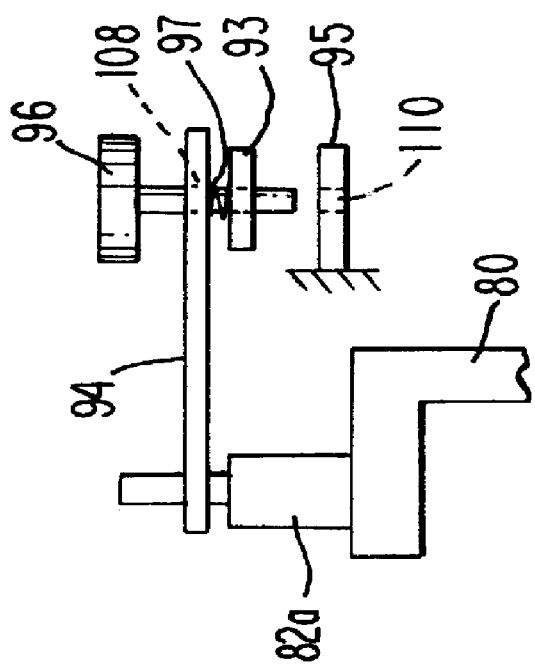
FIG. 24 is a side elevational view of a spring loaded locking mechanism.

Reference is now made to FIGS. 24 and 25, wherein an automatic locking mechanism is provided in accordance with another embodiment of the invention. Like numerals are utilized to indicate like structure. A positioning arm 94 is mounted on plug member shaft 82a to rotate therewith. A positioning pin 96 is slidably disposed within a hole 108 formed therethrough. A positioning pin retainer plate 93 is mounted on positioning pin 96. A positioning spring 97 is disposed about pin 96 between arm 94 and retainer plate 93. Positioning pin 96 is biased downward as is shown in FIG. 25 by positioning spring 97. Also provided is a positioning bracket 95, like bracket 98, being provided with a first hole 110 and a second hole (not shown) formed therethrough. When positioning arm 94 is placed in the closed position and eccentric plug member 80 is positioned to seal the first and second chambers from each other, positioning pin 96 will be aligned with the first hole formed through positioning bracket 95. Positioning pin 96 which is biased downward automatically moves into first hole 110 formed in positioning bracket 95 by positioning spring 97, thereby ensuring that eccentric plug member 80 is in its proper place, and also ensuring that eccentric plug member 80 will not be moved inadvertently from this sealed position.

When an operator wishes to open eccentric plug 80 and move it to its second position, whereby first lower chamber 20 and second upper chamber 40 are placed in fluid communication, positioning pin 96 is raised from its place in first hole 110 formed in positioning bracket 95 against the biasing force of positioning spring 97, and thereafter the positioning arm is moved to a position so that positioning pin 96 is aligned with the second hole formed in positioning bracket 95. Positioning pin 96 is again biased downward by positioning spring 97 and automatically moves into the second hole formed in positioning bracket 95, thereby locking positioning arm 94, and also eccentric plug member 80 into its second open position. Since movement of positioning arm 94 requires an operator to move positioning pin 96 against the biasing force of biasing spring 97, positioning arm 94 will not be moved inadvertently. Additionally, since positioning pin 96 is automatically biased into the proper hole in positioning bracket 95, there is no possibility of an operator not employing the locking mechanism.

Figure 21:
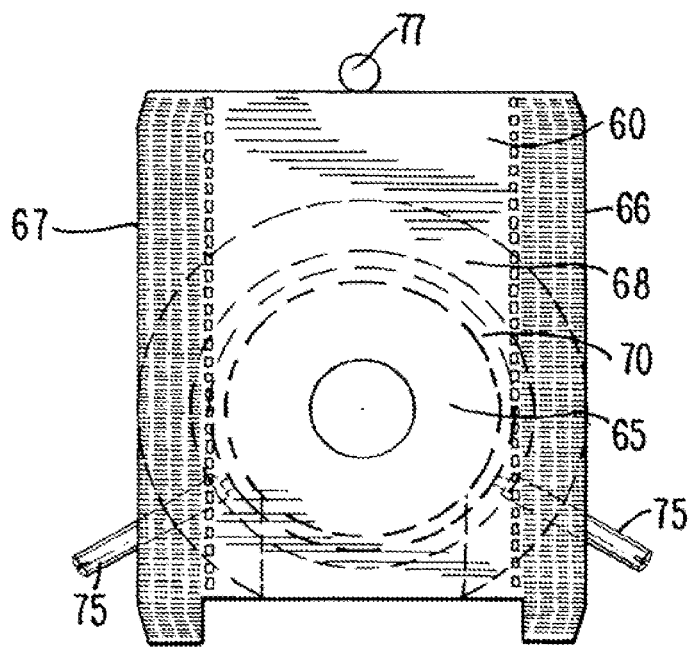
FIG. 21 is a top plan view of the adjustment pins and orifice plate carrier.

In an alternative embodiment depicted in FIGS. 20 and 21, like elements indicated by like structure, adjustment pins 75 are designed to pass through slots 69 of a collar portion 68. Collar portion 68 operates similarly to collar portion 64 described above, except slots 69 allow adjustment pins to come into contact with orifice plate seal 70. In this embodiment, adjustment pins 75 would shift orifice plate seal 70, and thus in turn orifice plate 65 relative to slotted collar portion 68 and orifice plate carrier 60. As is shown in FIG. 21, the centering of orifice plate 65 would be performed as above, but only orifice plate 65 and orifice plate seal would shift position.

Figure 22:
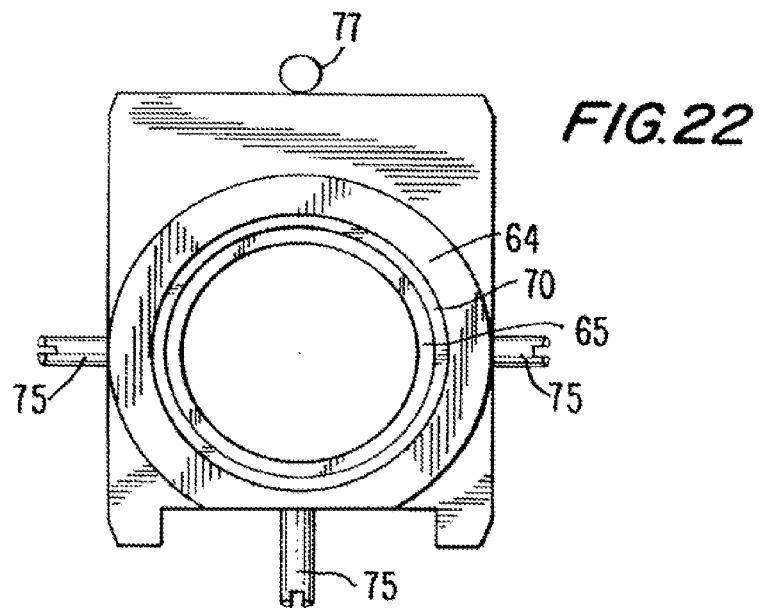
FIG. 22 is a top plan view showing adjustment pins.

Although as described above, two adjustment pins are used, in alternative embodiments, as shown in FIG. 22, it is possible to provide first lower chamber with three adjustment pins 75 rather than the two previously provided. These three adjustment pins would then interface with collar portion 64 of orifice plate carrier 60 in three positions as is shown in FIG. 22. Ball plunger 77 would still be provided in order to impart a downward force thereon, and the positioning of orifice plate 65 would be achieved through the use of three pins 75. Additionally, as above, it would be possible to provide a slotted collar 68 with three slots 69 to accommodate three adjustment pins 75. These pins would contact orifice plate seal 70 and would operate as noted above.

Figure 15:
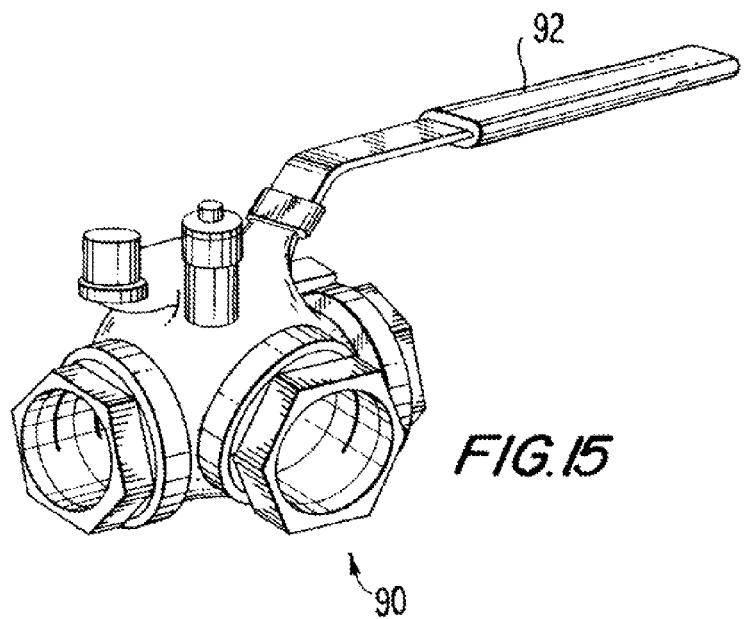
FIG. 15 is a perspective view of an L-port valve.
Figure 16A:
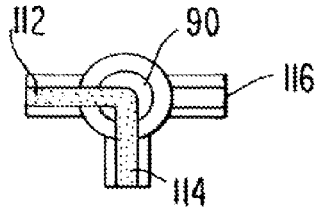
FIGS. 16A, 16B and 16C are schematic representations of the fluid flow when the L-port valve is positioned in each one of three positions.
Figure 16B:
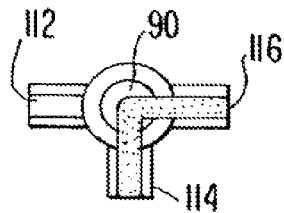
Figure 16C:
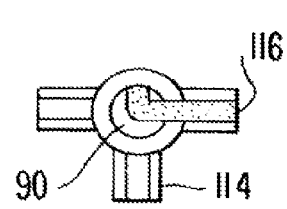
Figure 26:
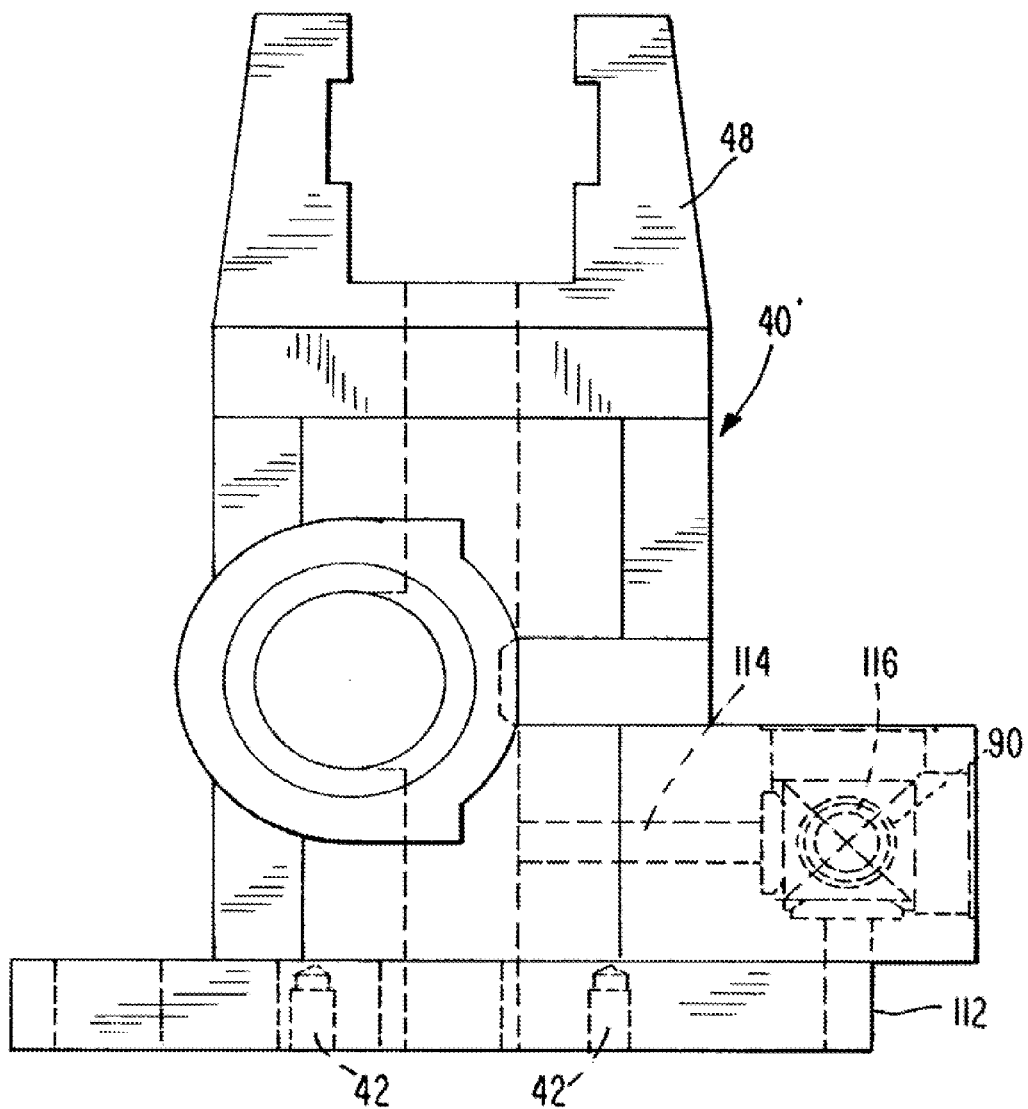
FIG. 26 is a cross-sectional view of an upper chamber embodiment.

It is noted that pressure equalization valve 52 and pressure evacuation valve 54 are formed as separate entities. However, in an alternative embodiment, it is possible to utilize a single L-port valve 90 to control both pressure equalization and bleeding. Such an L-port valve is shown in FIG. 15 and is shown mounted in a second upper chamber 40' as shown in FIG. 26. If such a valve were utilized, the valve includes three fluid passages substantially forming a T as shown schematically in FIGS. 16A-16C. A first passage 112 would extend from first lower chamber 20 to the valve position, a second passage 114 would extend from second upper chamber 40 to the valve position, and a third passage 116 would extend from the valve position to ambient air or of the proper evacuation area as is shown in FIGS. 16A-16C and FIG. 26 by way of example. Specifically, as shown in FIGS. 16A-16C, the trunk of the T would lead to first lower chamber 20, one of the two arms of the T would lead to second upper chamber 40 and the other of the arms of the T would lead to the proper evacuation point. However, any formulation of directions of the passages could be employed. Thus, L-port valve 90 (FIG. 15) would be displaceable through the use of a handle 92 or other mechanical means, between a first position whereby first lower chamber 20 were placed in fluid communication with second upper chamber 40, thereby equalizing pressure between the two chambers, a second position whereby second upper chamber 40 would be placed in fluid communication with ambient air or the proper evacuation means thereby forming a pressure evacuation path, and a third position whereby first lower chamber 20, and second upper chamber 40 would be sealed fluid tight from each other and from ambient air, thus constituting a block position. It is further noted with reference to FIGS. 15-16C, that the precise direction of each of the passages is specifically dependent upon the positioning of the valve in second upper chamber 40. The actual direction of any of these paths or where these paths lead may be altered without altering the effectiveness of this L-port valve apparatus as long as the three positions are performing the three required functions by providing the appropriate paths.

During use, dual chamber orifice fitting 10 would be inserted in line in the pipeline prior to the commencement of fluid flow therethrough. Therefore, as noted above, outlet 21 would be connected to the pipeline through bolts inserted through bolt holes 23 of flange 22. Additionally, inlet 24 would be connected to the inlet pipeline, thereby forming a continuous path from the pipeline, through dual chamber orifice fitting 10 and then back to the pipeline through outlet 21. When being assembled before fluid flow is commenced through the pipeline, orifice plate carrier 60, which carries orifice plate 65 and orifice plate seal 70, is placed within first lower chamber 20 and in the eventual fluid flow path through the pipeline, this position being shown in FIG. 4 and FIG. 5. Thereafter, upon the commencement of fluid flow through the pipeline, orifice plate 65 will already be in place, and the measurement of fluid can begin. Note that it might be necessary, after fluid flow begins, if orifice plate 65, or orifice plate carrier 60 were to shift its position, to utilize adjustment pins 75 in order to center orifice plate 65 within the pipeline as described above, and as will be further described below.

After fluid flow through the pipeline has been started, operations might be necessary while the fluid flow continues. These consist of removing the orifice plate in order to change the orifice plate, perform any other maintenance, or for any other reason.

To remove orifice plate 60, it is first necessary to move eccentric plug member 80 from its first position, in which it forms a fluid tight seal between first chamber 20 and second chamber 40 to its second position whereby first lower chamber 20 and second upper chamber 40 are placed in fluid communication with each other. However, before eccentric plug member 80 is moved, it is necessary to open pressure equalization valve 52 to place the two chambers 20 and 40 in fluid communication, thereby allowing second upper chamber 40 to fill with fluid and reach a pressure equal to that in first lower chamber 20. After the pressure between the two chambers is equalized, equalization valve 52 is closed. Thereafter, the movement of eccentric plug member 80 is achieved through the rotation of positioning arm 94 by removing positioning pin 96 from the first hole in positioning bracket 95, rotating the positioning arm 90 degree, or any other required rotational amount based on gearing mechanisms, and releasing positioning pin into the second through hole in positioning bracket 95. It should be noted that this procedure could also be performed without the positioning bracket, by simply moving the positioning arm 94 from a first position to a second position. Movement of plug 80 may be accomplished without positioning arm 94 by directly turning rotating plug member shaft 82a. Movement of positioning arm 94 in turn rotates plug member shaft 82 to which eccentric plug member 80 is fixed.

As is further shown in FIG. 4, outer face 81 of eccentric plug member 80 is moved away from radially engaging face 86 of seat plate 85, thereby opening communication path 35 between first lower chamber 20 and second lower chamber 40, placing these chambers in fluid communication with each other. It should be noted that if the apparatus is operated with communication path 35 open, it is not necessary to perform these first two steps, since the chambers will be in fluid communication through communication path 35, and thus at equal pressure. Also eccentric plug member 80 will already be in its second position.

Movement of eccentric plug member 80 from its first position to its second position further opens up communication path 35 to allow orifice plate carrier 60 and its associated components to pass therethrough. After communication path 35 has been opened, the next step required is to move orifice plate carrier 60 vertically out of the fluid flow path in the pipeline. Because eccentric plug 80 is eccentric and substantially C-shaped, it is positioned out of the travel path of orifice carrier plate 60. By rotating rotational movement rod 62 in a predetermined direction, gears 63, meshing with racks 66 and 67 moves orifice plate carrier 60 towards communication path 35. Gear 63 mounted on rotational movement rod 62 remain meshed with parallel gear racks 66 and 67 mounted on orifice plate carrier 60. When rotational movement rod 62 is rotated in the proper direction, gears 63 move orifice plate carrier 60 upward through contact with parallel gear racks 66 and 67. This rotation is continued until the lower edge of orifice plate carrier 60 reaches the level of rotational movement rods 62.

At this point, orifice plate carrier 60 will be contained within communication path 35, and will be situated between first lower chamber 20 and second upper chamber 40. Additionally at this time, gears 45 mounted on plate movement rod 44 will have come into contact with parallel gear racks 66 and 67 mounted on orifice plate carrier 60. Rotation of plate movement rod 44 moves orifice plate carrier 60 further in the vertical position when gears 45 mesh with parallel gear racks 66 and 67. To continue the movement of orifice plate carrier 60 into cavity 56, plate movement rod 44 is rotated in the predetermined direction, and gears 45 move orifice plate carrier 60 into cavity 56 by meshing parallel gear racks 66 and 67. This movement is continued until the entirety of orifice plate carrier 60 is contained within second upper chamber 40.

At this time, it is necessary to seal second upper chamber 40 from first lower chamber 20 before opening second upper chamber 40 and removing orifice plate carrier 60. This is achieved by the movement of eccentric plug member 80 from its second position, whereby communication path 35 is open and first lower chamber 20 and second upper chamber 40 are in fluid communication with each other, to its first position, whereby first lower chamber 20 and second upper chamber 40 are sealed from each other. This movement is achieved by the opposite step required to move eccentric plug member 80 from its first position to its second position, specifically moving positioning pin from the second through hole in positioning bracket 95, rotating positioning arm in the direction opposite to that utilized previously, and replacing positioning pin 96 in the first hole of positioning bracket 95. This movement rotates plug member shaft 82a in the proper direction, thereby replacing outer face 81 of eccentric plug member 80 against radial engaging face 86 of seat plate 85. It should be noted at this time that no additional grease or sealant material is required to be inserted into the mechanism in order to insure a proper seal. Because of the use of eccentric plug member 80, and the specific shape thereof, the engagement between outer face 81 and radially engaging phase 86 is fluid tight, and is aided by the pressure of the fluid in first lower chamber 20 against inner face 83 of eccentric plug member 80.

After eccentric plug member 80 has been replaced, first lower chamber 20 and second upper chamber 40 will be sealed from each other, thereby sealing second upper chamber 40 from the fluid flow through the pipeline. However, at this time, the pressure of the fluid within second upper chamber 40 is greater than atmospheric pressure, and would be somewhat similar to the pressure imparted by the fluid flow through the pipeline. Therefore, it is necessary to release the pressure in this second upper chamber 40 before opening second upper chamber 40. Therefore, pressure evacuation valve 54 is opened to allow the fluid to be evacuated from second upper chamber 40 through pressure evacuation path 55. It is noted that this pressure evacuation path through pressure evacuation valve 54 may evacuate the fluid within second upper chamber 40 to ambient air, or to other proper waste facility, depending upon the type of fluid being transported in the pipeline. After opening pressure evacuation valve, the pressure within second upper chamber 40 will drop to ambient pressure, and thereafter pressure evacuation valve 54 can be closed.

At this point in time, it is then possible to open second upper chamber 40, since the chamber is no longer pressurized, and thereafter remove orifice plate carrier 60. This opening is achieved as is shown in FIG. 3 and FIG. 4, by the removal of retaining bolts 47 from upper retaining member 46 and sealing member 46a. After these bolts are removed, both upper retaining member 46 and sealing member 46a may be removed from the upper portion of second upper chamber 40. Thereafter, to allow for the removal of orifice plate carrier 60, it is necessary to further rotate plate movement rod 44 in the proper direction to urge orifice plate carrier 60 further in the vertical direction, and therefore out of the upper portion of second upper chamber 40. After orifice plate carrier 60 is removed from second upper chamber 40, it is possible to remove orifice plate 65 and orifice plate seal 70, in order to insert a new orifice plate seal 70 and orifice plate 65, or to perform any repairs required on any of the parts. Therefore, by removing the orifice plate using the dual chamber orifice fitting 10, it is possible to remove such plate without the requirement of interrupting the flow of fluid through the pipeline.

Next, after repairs or replacement has been performed, orifice plate 65 and orifice plate seal 70 would be replaced in orifice plate carrier 60, to form a unit as described above. Thereafter, it is necessary to reinsert orifice plate carrier 60 into the path of the fluid flow through the pipeline. Therefore, orifice plate carrier 60, containing orifice plate 65 and orifice plate seal 70 is inserted into the upper portion of second upper chamber 40 until parallel gear racks 66 and 67 come into contact with gears 45 of plate movement rod 44. Thereafter, plate movement rod 44 is rotated in the proper direction, opposite the above described predetermined direction, to move orifice plate carrier downward into second upper chamber 40. This direction will be opposite of that previously used to move orifice plate carrier upward. Movement will be achieved through gears 45 engaging parallel gear racks 66 and 67 and urging orifice plate carrier 60 downward in the vertical direction. This movement is continued until the entire orifice plate carrier 60 is contained within second upper chamber 40. Thereafter, upper retaining member 46 and sealing member 46a are placed in their proper positions within second upper chamber 40, and retaining bolts 47 are inserted and tightened to secure upper retaining member 46 and sealing member 46a within second upper chamber 40, thereby forming a fluid tight seal, and sealing second upper chamber 40 from ambient air or the like.

Next, it is necessary to close pressure evacuation valve 54 and then to equalize the pressure between second upper chamber 40 and first lower chamber 20 before communication path 35 is opened. Therefore, pressure equalization valve 52 should be opened, therefore placing first lower chamber 20 and second upper chamber 40 in fluid communication with each other through pressure equalization path 35. The opening of this pressure equalization path allows fluid from first lower chamber 20 to enter second upper chamber 40, thereby equalizing the pressure therebetween.

It should be noted that if the L-port valve of FIG. 15 is utilized, the steps described regarding pressure evacuation valve 54 and pressure equalization valve 52 would be performed somewhat differently. Specifically, when the two chambers are to be sealed from each other, the L-port valve would be placed in a block position, as shown in FIG. 16C. During the pressure evacuation step, the L port would be placed in an evacuation position as is shown in FIG. 16B. This would allow second upper chamber 40 to be in fluid communication with ambient air, or other evacuation mechanisms. Finally, when the equalization step is performed between first lower chamber 20 and second upper chamber 40, the L-port valve would be placed in an equalizing position as shown in FIG. 16A, thereby placing first lower chamber 20 in fluid communication with second upper chamber 40. As noted above, the use of this L-port valve allows for ease of choice between the three positions, and also insures that both the pressure equalization valve and pressure evacuation valve are not opened at the same time, thereby reducing the danger involved in removing orifice plate carrier 60 from the fluid flow of the pipeline.

After the pressure has been equalized between the two chambers, eccentric plug member 80 is opened, thereby opening communication path 35 between first lower chamber 20 and second upper chamber 40. Eccentric plug member 80 is opened through the same procedure as is followed above to move eccentric plug member 80 from its first position to its second position.

After communication path 35 is opened, plate movement rod 44 is further rotated in the direction whereby orifice plate carrier 60 is moved into first lower chamber 20. This movement is continued until parallel gear racks 66 and 67 no longer mesh with gears 45 of plate movement rod 44. After orifice plate carrier 60 moves into communication path 35, gears 63 will mesh with the lower edge of orifice plate carrier 60 and parallel gear racks 66 and 67. Thereafter, rotational movement rod 62 is moved in the proper direction so as to continue and complete the movement of orifice plate carrier 60 into first lower chamber 20, and into the path of fluid flow in the pipeline.

After the downward movement of orifice plate carrier 60 by rotational movement rod 62 has been completed, orifice plate carrier 60 will be properly positioned within the fluid flow in the pipeline. Thereafter, eccentric plug member 80 is closed so as to seal first lower chamber 20 and second upper chamber 40 from each other. The movement of this eccentric plug member 80 from its second position to its first position is performed as is noted above when removing orifice plate carrier 60. Additionally, the pressure in second upper chamber should be released through the use of pressure evacuation valve 54 as described above. If dual chamber orifice fitting 10 is to be operated with eccentric plug member 80 in the open, or second position, the last two steps of moving eccentric plug member 80 and releasing the pressure in second upper chamber 40 need not be performed.

After orifice plate carrier 60 has been replaced in the fluid flow path of the fluid in the pipeline, if necessary, adjustment pins 75 may be employed to insure that the orifice plate and hole therethrough is centered within the pipeline. As noted above during the description of these adjustment pins, either two adjustment pins or three adjustment pins may be provided. These adjustment pins may be adjusted from outside of dual chamber orifice fitting 10, and may be used to insure that the orifice plate is properly centered in the fluid flow path while the fluid continues to flow. After the orifice plate has been properly centered, measurement of the fluid flow in the pipeline can be resumed.

Thus, an improved dual chamber orifice fitting has been disclosed, wherein an improved plug member is utilized, adjustment pins may be used to insure proper centering of the orifice plate, a single valve may be used for pressure equalization and pressure evacuation, and an improved seal member is provided on the orifice plates to insure proper measurement. Each of these improvements is beneficial to the overall functioning of the dual chamber orifice plate, and insures more accurate measurement of fluid flow in a pipeline measured thereby.

Because of its shape, the pressure of the fluid against the eccentric plug aids to maintain the fluid tight seal between the first and second chambers, and no additional grease or sealing fluid is required to maintain a fluid tight seal. Additionally, since the eccentric plug moves rotationally, as opposed to the lateral movement which is employed in the prior art, it is possible to easily move the plug to and from the first and second positions and the rotation may be geared in any way to provide any additional mechanical advantage necessary to overcome the fluid pressure against the eccentric plug.

An orifice plate seal is provided which specifically maintains its seal, and is in fact aided by the pressure of the fluid flowing in the pipeline. During upward or downward movement of the orifice plate when it is being inserted into or removed from the pipeline, a fluid tight seal is maintained around the outer edge of the seal, and therefore all fluid flowing through the pipeline is directed through the through hole formed in the orifice plate.

Figure 27:
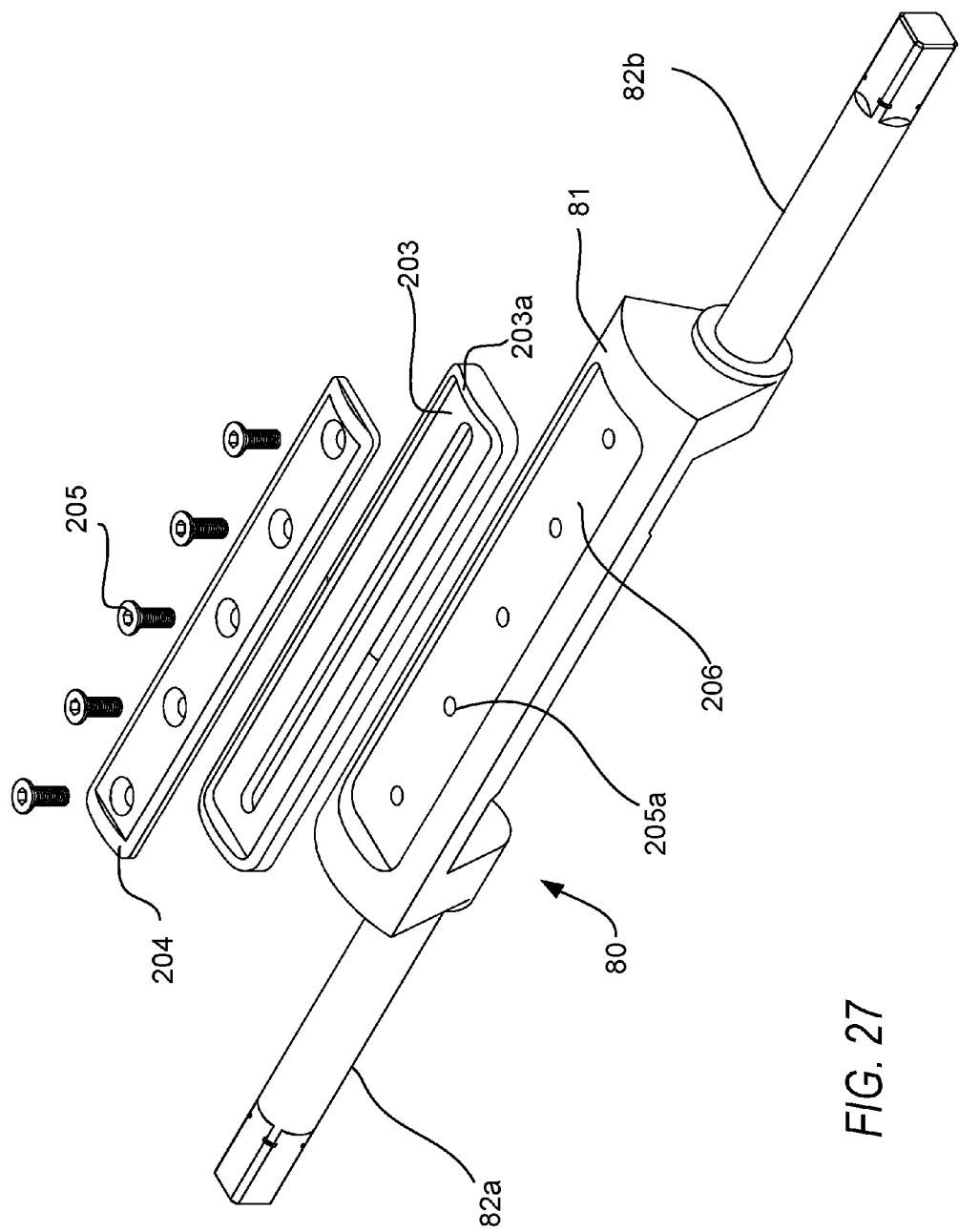
FIG. 27 illustrates a sealing plug member having an insert seat.
Figures 28A, 28B:
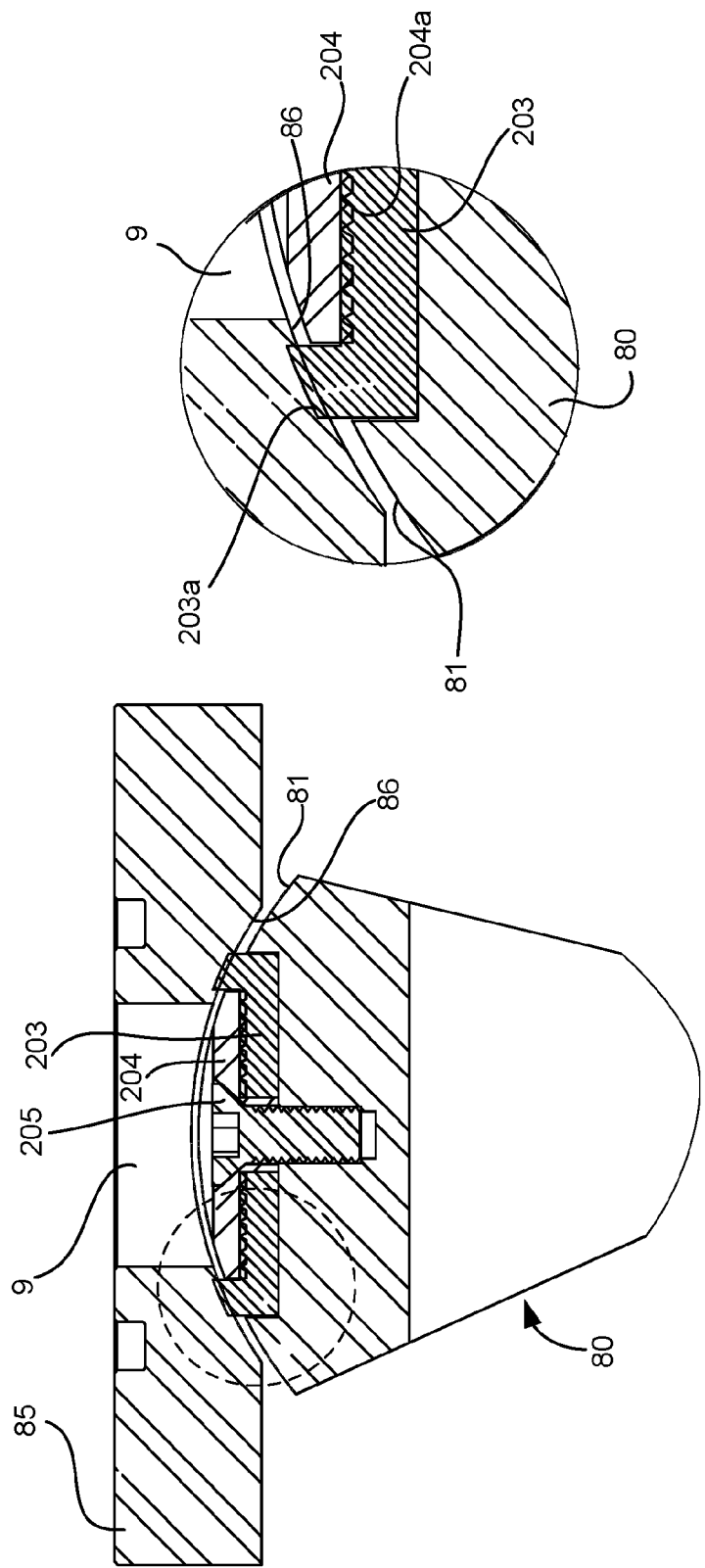
FIG. 28a and FIG. 28b illustrate a sealing engagement of a sealing plug member and a seat plate.

An alternative embodiment of eccentric plug member 80 is illustrated in FIG. 27. According to this embodiment, eccentric plug member 80 is not rubberized, as described above, but rather is formed of a hard material, such as metal or ceramic. For example, eccentric plug member 80 can be made of steel or other alloy(s). According to the embodiment illustrated in FIG. 27, curved outer face 81 of eccentric plug member 80 includes pocket 206, which is configured to receive insert seat 203. Insert seat 203 is typically a non-metallic material, for example, a plastic, thermoplastic, or ceramic. A particular example of a suitable material for insert seat 203 is Teflon. According to one embodiment, insert seat 203 includes a lip 203a around the perimeter of insert seat 203, for forming a sealing engagement with seat plate 85 (ref. FIG. 28b). Insert seat 203 is held in place by retainer plate 204, which is typically made of a metallic material such as steel. Retainer plate 204 serves both to retain insert seat 203 and to prevent insert seat material (e.g., Teflon) from extruding into opening 9 (ref. FIG. 28a) during operation of fitting 10. According to one embodiment, retainer plate 204 includes grooves 204a (ref. FIG. 28b) to 'grip' insert seat 203 and prevent insert seat material from extruding. Insert seat 203 and retainer plate 204 are held in place by retainer plate screws 205, which engage mating receiving holes 205a in eccentric plug member 80.

Referring to FIGS. 28a and 28b, insert seat 203 forms a sealing engagement with seat plate 85 when eccentric plug member 80 is rotated to the closed position. Specifically, insert seat 203 sealingly contacts radial engaging face 86 of seat plate 85. A particularly preferred embodiment is illustrated in FIG. 28b, wherein it is clear that lip 203a of insert seat 203 sealingly engages engaging face 86 and does not protrude into opening 9.

It will thus be seen that the objects set forth above, and those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What is claimed is:

1. A sealing member for a dual chamber orifice fitting, rotatable from a first position wherein the sealing member seals the two chambers from each other and a second position wherein the two chambers are in fluid communication with each other, the sealing member comprising:
an eccentric elongated body having two ends and a curved sealing surface, the sealing surface having a pocket recessed therein for containing an insert seat;
a non-metallic insert seat disposed in the pocket and configured to sealingly engage a seat plate when the sealing member is in the first position; and
a retainer plate disposed on a surface of the insert seat and configured to retain the insert seat in the recessed pocket.

2. The sealing member of claim 1, wherein the insert seat comprises a material selected from the group consisting of plastics, thermoplastics, polytetrafluoroethylene, and ceramics.

3. The sealing member of claim 2, wherein the insert seat comprises polytetrafluoroethylene.

4. The sealing member of claim 1, wherein the insert seat comprises a raised lip around a circumference of the insert seat.

5. The sealing member of claim 1, wherein the retainer plate includes grooves on a surface of the retainer plate that contacts the insert seat.

6. The sealing member of claim 1, further comprising shafts connected to each of the ends of the body.

7. The sealing member of claim 6, wherein the shafts are welded or pinned to the body.

8. The sealing member of claim 6, wherein the body and the shafts are cast as a unit.

9. The sealing member of claim 1, wherein the body is essentially C-shaped.

10. A sealing configuration for a dual chamber orifice fitting, comprising:
a sealing member rotatable from a first position wherein the sealing member seals the two chambers from each other and a second position wherein the two chambers are in fluid communication with each other, the sealing member comprising:
an eccentric elongated, essentially C-shaped body having a two ends and a curved sealing surface, the sealing surface having a pocket recessed therein for containing a non-metallic insert seat;
a non-metallic insert seat disposed in the pocket and configured to sealingly engage a seat plate, when the sealing member is in the first position;
a retainer plate disposed on a surface of the insert seat and configured to retain the insert seat in the recessed pocket; and
shafts connected to each of the ends of the body; and
a seat plate having an opening for providing fluid communication between the two chambers, the seat plate configured to sealingly engage the insert seat when the sealing member is in the first position.

11. The sealing configuration of claim 10, wherein the insert seat comprises a raised lip around a circumference of the insert seat that sealingly engages the seat plate when the sealing member is in the first position.

12. An improved dual chamber orifice fitting, comprising,
a first chamber maintained in fluid communication with a pipeline, a fluid flowing in the pipeline passing through the first chamber;
a second chamber selectively maintained in fluid communication with the first chamber;
a sealing member formed as an eccentric plug member selectively rotatable from a first position wherein the sealing member seals the first chamber from the second chamber, and a second position wherein the sealing member permits the first chamber to be placed in fluid communication with the second chamber, the eccentric plug member traveling along an eccentric path between the first and second positions;
wherein the improvement comprises:
a sealing member comprising;
an elongated, essentially C-shaped body having a two ends and a curved sealing surface, the sealing surface having a pocket recessed therein for containing a non-metallic insert seat;

a non-metallic insert seat disposed in the pocket and configured to sealingly engage a seat plate when the sealing member is in the first position;

a retainer plate disposed on a surface of the insert seat and configured to retain the insert seat in the recessed pocket; and shafts connected to each of the ends of the body.

* * * * *